No. 625,918. Patented May 30, 1899.
E. BAILEY, G. R. COX & W. T. HEY.
PROCESS OF AND APPARATUS FOR PRODUCING WHITE LEAD.
(Application filed Oct. 18, 1898.)
(No Model.)
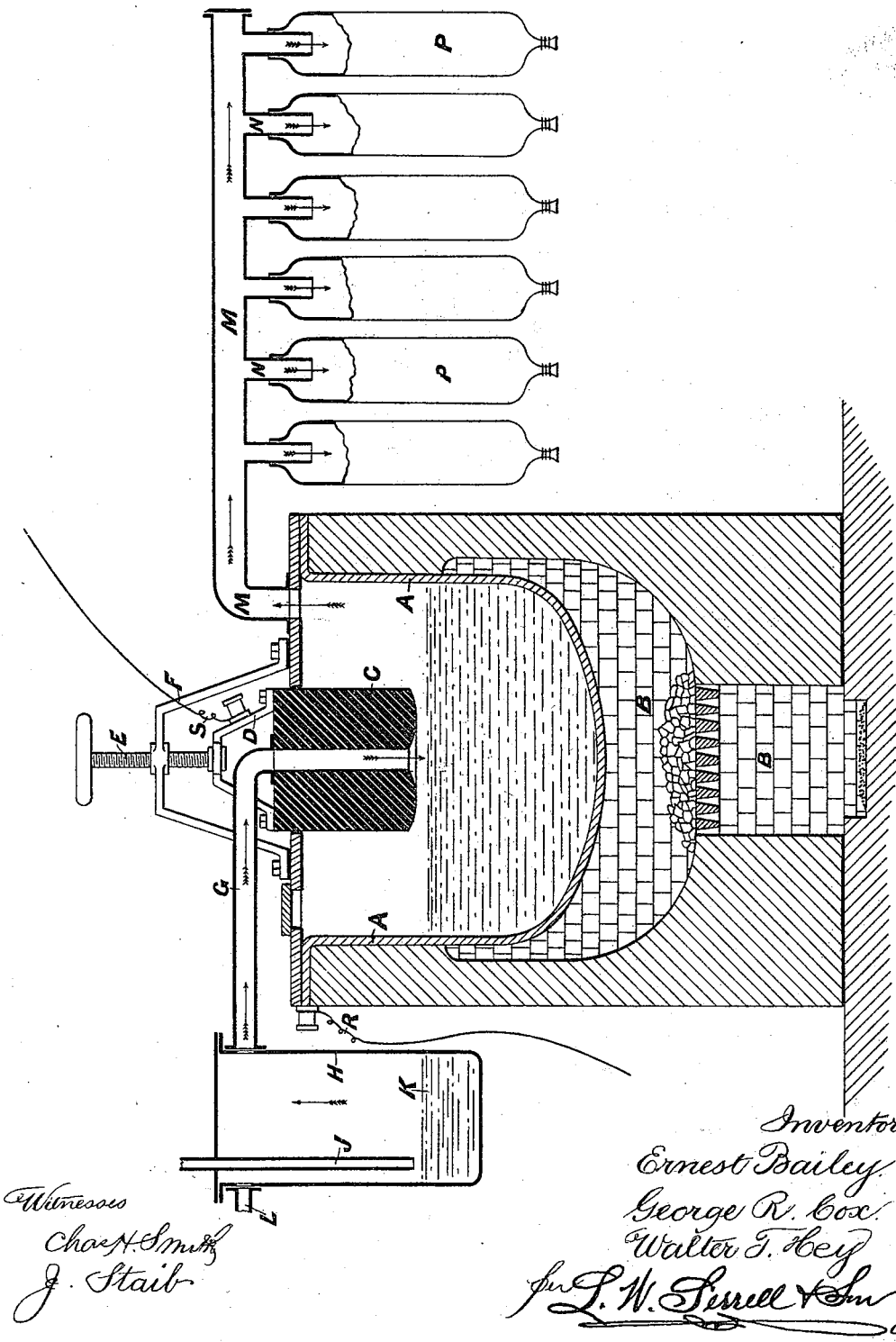
Inventors
Ernest Bailey
George R. Cox.
Walter T. Hey

UNITED STATES PATENT OFFICE.

ERNEST BAILEY, GEORGE REEVE COX, AND WALTER THOMAS HEY, OF YORK, ENGLAND.

PROCESS OF AND APPARATUS FOR PRODUCING WHITE LEAD.

SPECIFICATION forming part of Letters Patent No. 625,918, dated May 30, 1899.

Application filed October 18, 1898. Serial No. 693,872. (No model.)

*To all whom it may concern:*

Be it known that we, ERNEST BAILEY, GEORGE REEVE COX, and WALTER THOMAS HEY, subjects of the Queen of Great Britain and Ireland, and residents of the city and county of York, England, have invented a certain new and useful Process of and Apparatus for the Production of White Lead, (for which we have made application for a patent in Great Britain, No. 7,877, bearing date April 2, 1898,) of which the following is a specification.

This invention refers to a process of and apparatus for the production of white lead from pig-lead, the object being to dispense with apparatus for grinding, washing, and drying and the processes connected therewith and to produce a white lead in a more direct and rapid manner than heretofore.

In order that our invention may be clearly understood, we will proceed to describe the same with reference to the accompanying drawing, in which the various parts are denoted by various letters of reference.

According to our invention we employ a closed vessel A for the reception of the lead to be volatilized, and a furnace B is provided for the purpose of bringing the lead to the required degree of heat.

C is a bored carbon pole, which is suspended by means of a bracket D and regulating-screw E to an insulated bridge F, and the central hole in the carbon C is connected with a tube G, which conducts the required steam and gases to the interior of the vessel A. The gases are mixed together in a vessel H, the steam being conducted to the lower part of the vessel H by means of a pipe J, where it plays on the surface of a solution of acetic acid K.

L is an inlet-pipe for the admission of carbonic-acid gas to the vessel H, and the mixture of the carbonic-acid gas, steam, and acetic-acid vapor passes off by the pipe G.

M is an outlet-tube from the vessel A, and N are pendent spouts, to which are attached flannel collecting-bags P.

R is the positive pole of an electric circuit, which is connected to the vessel A, and S is the negative connection of the same circuit, which is connected to the bracket D of the carbon C.

The pig-lead is placed in the vessel A, where it is brought to the required molten state by the furnace B, and the carbon C is then adjusted to the required position by means of the regulating-screw E. The steam and carbonic-acid gas are then turned on and a mixture of the requisite gases passes through the pipe G to the center of the carbon C, the said mixture being delivered on the surface of the molten lead. An electric current, which is obtained from an electro generator or accumulator, passing from the connection R to the connection S forms an arc between the carbon C and the surface of the molten lead, thereby volatilizing the lead, and the fumes combine with the compound gases entering the vessel A by the pipe G and pass to the outlet-tube M, along which they travel, and descend into the collecting-bags P, where they condense and settle in a finely-divided state.

The height of the molten lead in the vessel A may be maintained constant by means of a separate supply-tank, to which it is connected by a ball-cock or by other suitable connection.

Having now described our invention, what we claim as new, and desire to secure by Letters Patent, is—

1. The method herein specified of manufacturing white lead consisting in melting the lead, volatilizing the lead at the surface of the molten metal by the action of an electric arc, directing the necessary commingled gases or fumes against the surface of the molten lead at the point of volatilization and conveying away the resulting product, substantially as specified.

2. The method herein specified of manufacturing white lead, consisting in melting the lead, commingling steam, carbonic-acid gas and acetic-acid fumes and directing the same upon the body of the molten lead and simultaneously volatilizing the lead by subjecting its surface to the action of an electric arc around the point of delivery of said gases, conveying away the resulting product and receiving the same in suitable receptacles, substantially as set forth.

3. In the manufacture of white lead, the combination with a closed vessel and means for melting the lead, of a hollow carbon pole passing through the cover of the vessel, means above the cover of the closed vessel for supporting the said pole, electrical connections to the closed vessel and to the carbon pole, a commingling vessel and a pipe therefrom to the hollow carbon pole, a delivery-pipe and a receptacle for the white lead and means for maintaining the relation of the opposing surfaces of the carbon pole and the molten lead, substantially as set forth.

4. In the manufacture of white lead, the combination with a closed vessel and means for melting the lead, of a hollow carbon pole passing through the cover of the vessel, adjustable means above the cover of the closed vessel for supporting said pole for maintaining the relation of the opposing surfaces of the carbon pole and the molten lead, electrical connections to the closed vessel and to the carbon pole, an adjacent commingling vessel and a pipe therefrom to the hollow carbon pole, a delivery-pipe and a receptacle for the white lead, substantially as set forth.

In witness whereof we have hereunto set our hands in presence of two witnesses.

ERNEST BAILEY.
GEORGE REEVE COX.
WALTER THOMAS HEY.

Witnesses:
 ALFD. HUNTER,
 W. H. CLOSE.